United States Patent [19]

Kamimura et al.

[11] 3,962,727

[45] June 8, 1976

[54] MAGNETIC ROTARY HEAD RECORDER WITH AUTOMATIC TAPE LOADING AND UNLOADING

[75] Inventors: Tomohisa Kamimura, Ichikawa; Makoto Suzuki, Tokyo, both of Japan

[73] Assignee: Sony Corporation, Tokyo, Japan

[22] Filed: Nov. 20, 1974

[21] Appl. No.: 525,677

[30] Foreign Application Priority Data

Nov. 20, 1973 Japan.............................. 48-130404

[52] U.S. Cl.................................. 360/85; 360/132
[51] Int. Cl.$^2$.................. G11B 15/66; G11B 23/04
[58] Field of Search ................ 360/85, 95, 132, 96; 242/200, 197, 198, 199

[56] References Cited
UNITED STATES PATENTS

| | | | |
|---|---|---|---|
| 3,608,908 | 9/1971 | Yamamoto et al. ................... | 360/96 |
| 3,672,603 | 6/1972 | Swain................................. | 360/132 |
| 3,740,495 | 6/1973 | Kihara ................................. | 360/85 |
| 3,860,960 | 1/1975 | Akamine.............................. | 360/85 |

*Primary Examiner*—Robert S. Tupper
*Attorney, Agent, or Firm*—Lewis H. Eslinger; Alvin Sinderbrand

[57] ABSTRACT

In a magnetic recording and/or reproducing apparatus having a tape guide drum, at least one rotary magnetic head moved in a circular path coinciding with the circumferential surface of the drum for scanning a magnetic tape wrapped about at least a portion of that surface, a tape supply such as, a cassette containing reels on which a magnetic tape is wound, a capstan spaced from the guide drum, a holder for receiving and positioning the cassette at a location spaced from the guide drum, and a tape loading and unloading device which comprises a support ring rotatable around the drum between inactive and operative positions in a substantially horizontal arcuate path that extends adjacent the capstan and the holder, a tape engaging member including a pinch roller extending upwardly from the support ring and being movable with the latter in the aforementioned arcuate path for projecting from below into an opening of the cassette positioned by the holder and engaging the tape extending across such opening with the support ring in its inactive position and for withdrawing a progressively extended loop of tape from the cassette and wrapping one side of the extended tape loop about at least a portion of the guide drum circumference in response to movement of the support ring from the inactive to the operative position at which the pinch roller is located within the tape loop adjacent the capstan with the tape of the loop therebetween; the support ring of the tape loading and unloading device is formed of first and second arcuate parts which are pivotally connected to each other in end-to-end relation to permit swinging of the first part relative to the second part between a raised position coplanar with the second part and a depressed position in which the first part is inclined downwardly from the second part, the first part of the support ring carries all of the tape engaging members and extends toward the cassette holder in the inactive position of the support ring, and the support ring is carried by a plurality of rollers spaced apart about the arcuate path with each one of the rollers carrying the first part of the support ring in the inactive position of the latter being substantially vertically movable to move the first part between its raised and depressed positions. By reason of the foregoing, the cassette holder may have a fixed horizontal base over which the cassette can be slidably moved to and from an operative cassette position with the first part of the ring in its depressed position to dispose the tape engaging members below the holder base. With the cassette in its operative position, the first part of the support ring can be moved to its raised position for projecting the tape engaging members into the cassette opening. Further, reel drive members are movable axially between depressed positions below the holder base and raised or operative positions in which the reel drive members project through the holder base for engagement with the reels in a cassette operatively positioned on such base, and a control mechanism is provided for simultaneously moving the first part of the support ring and the reel drive members between their respective depressed and raised positions.

11 Claims, 12 Drawing Figures

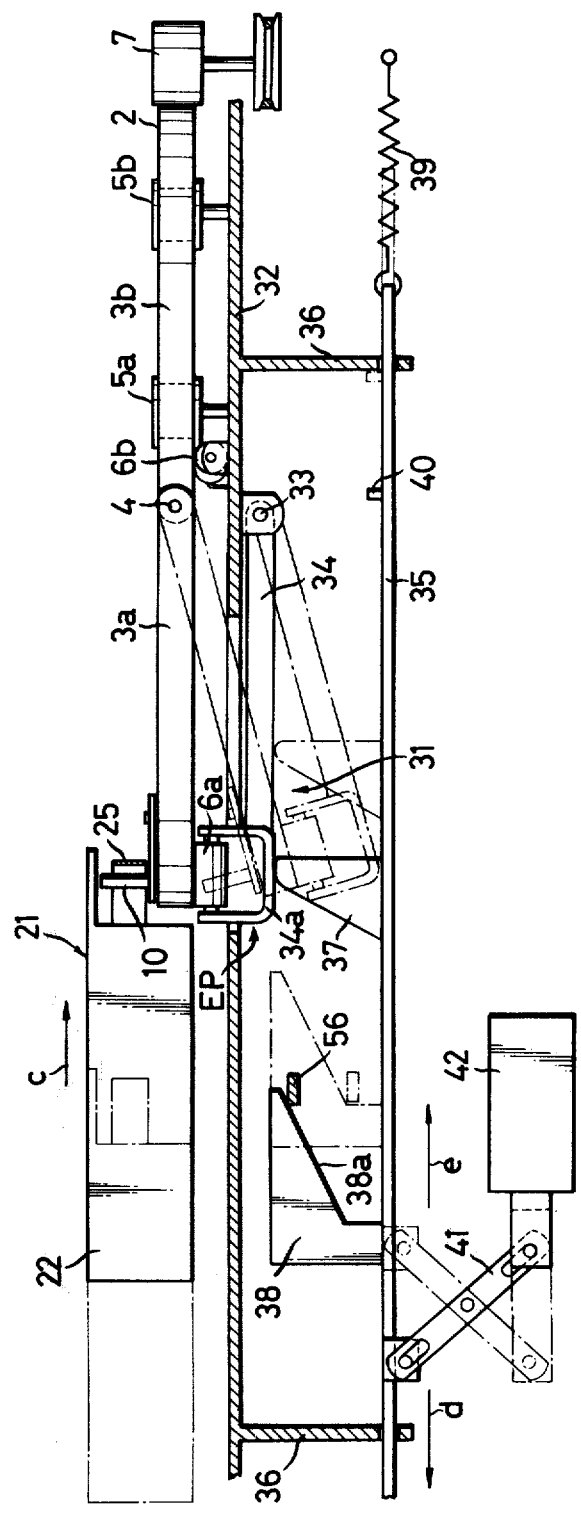

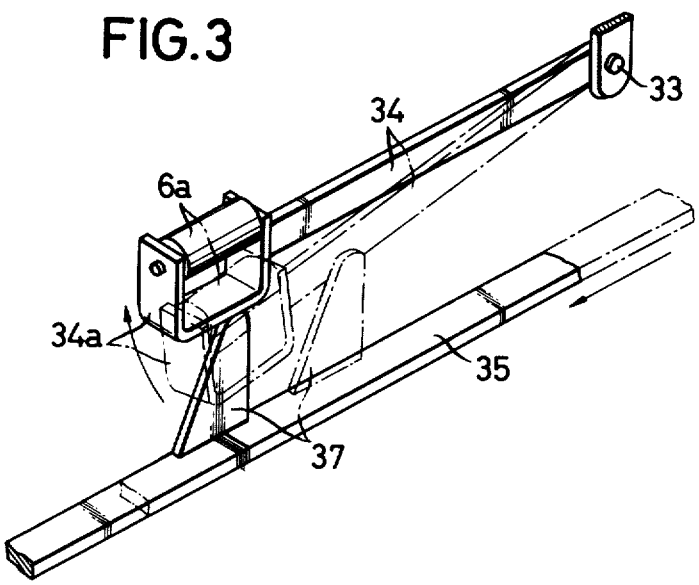
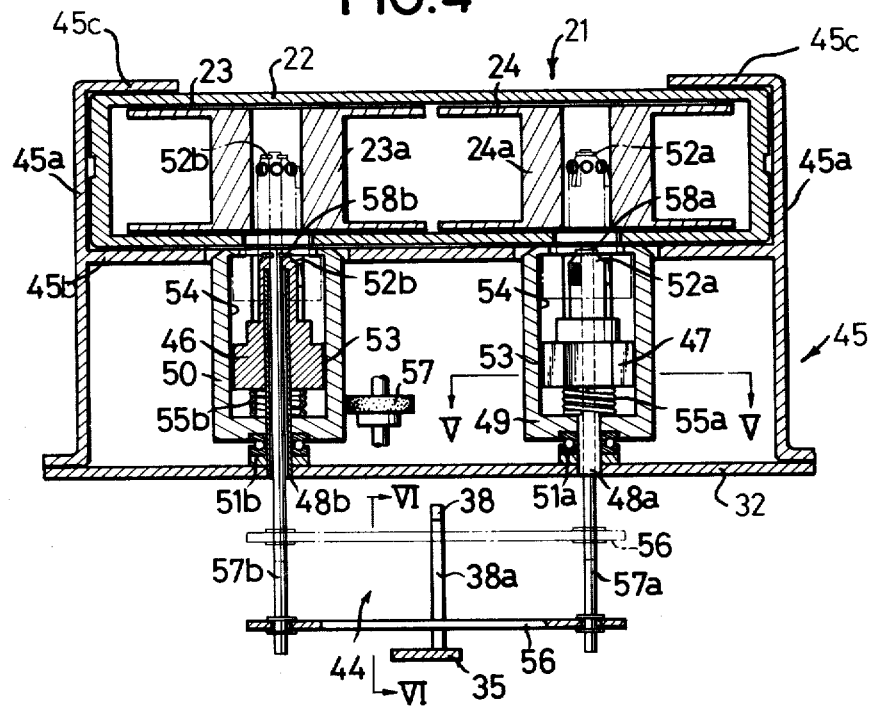

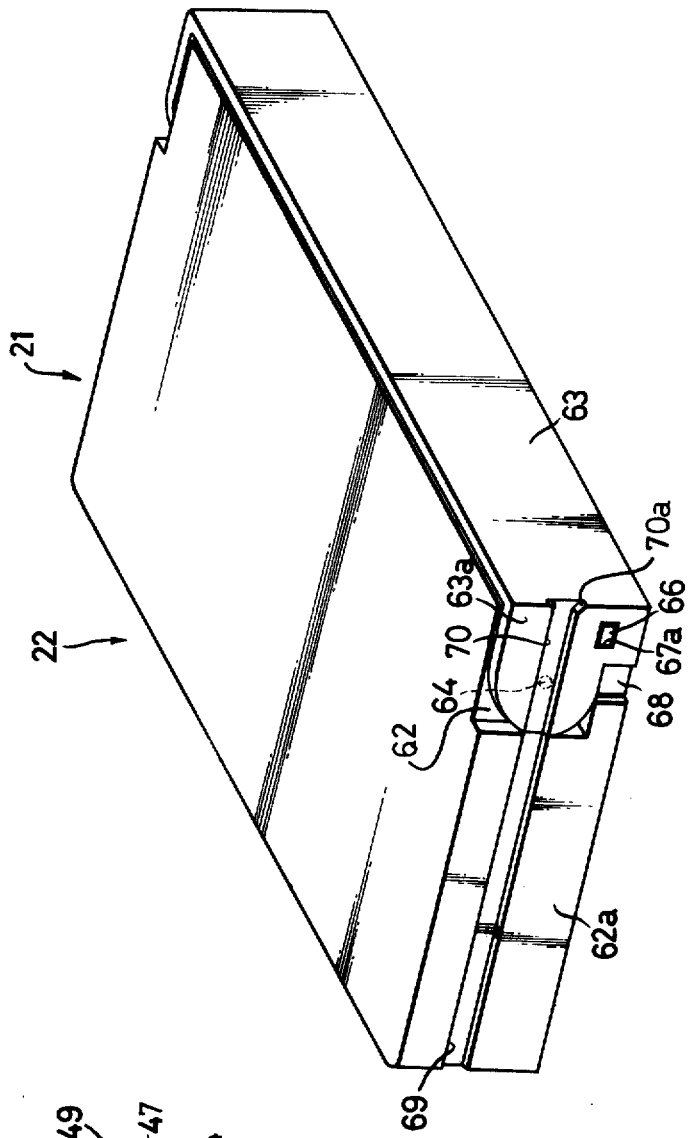
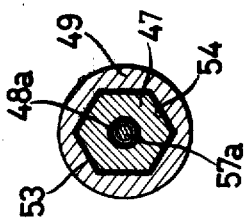

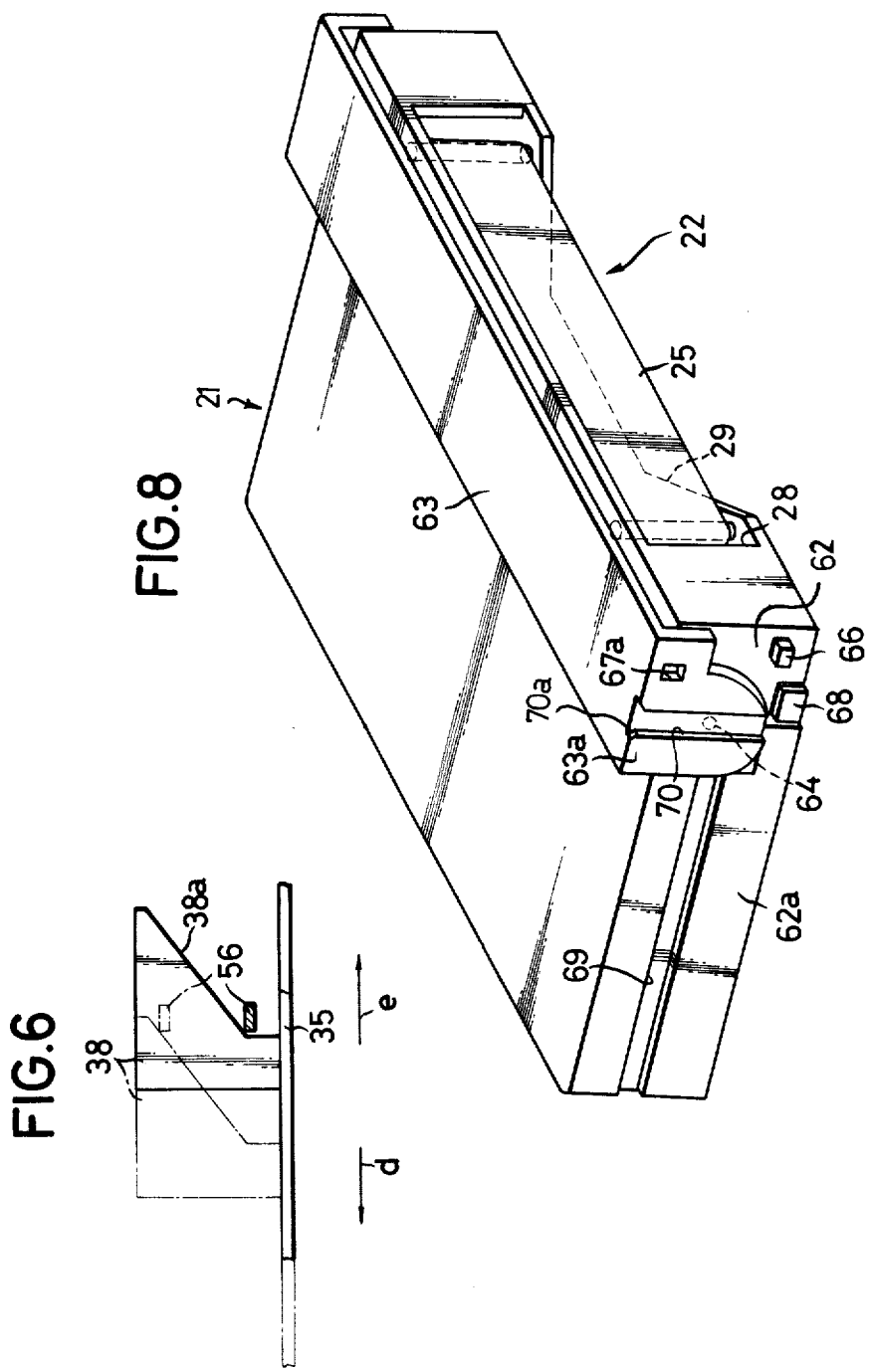

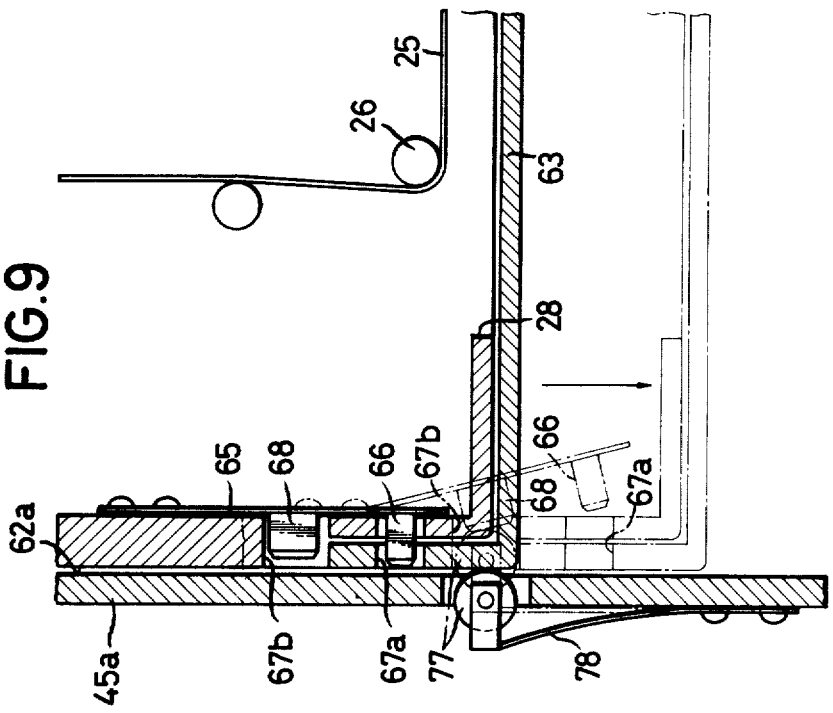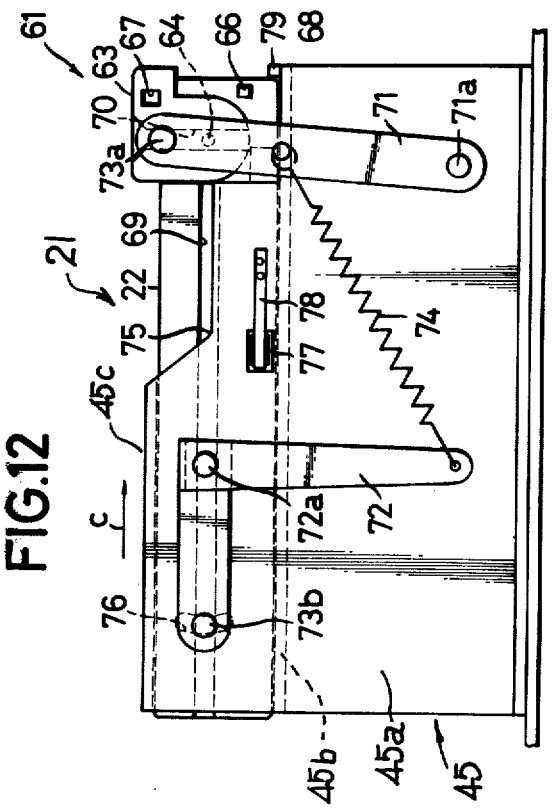

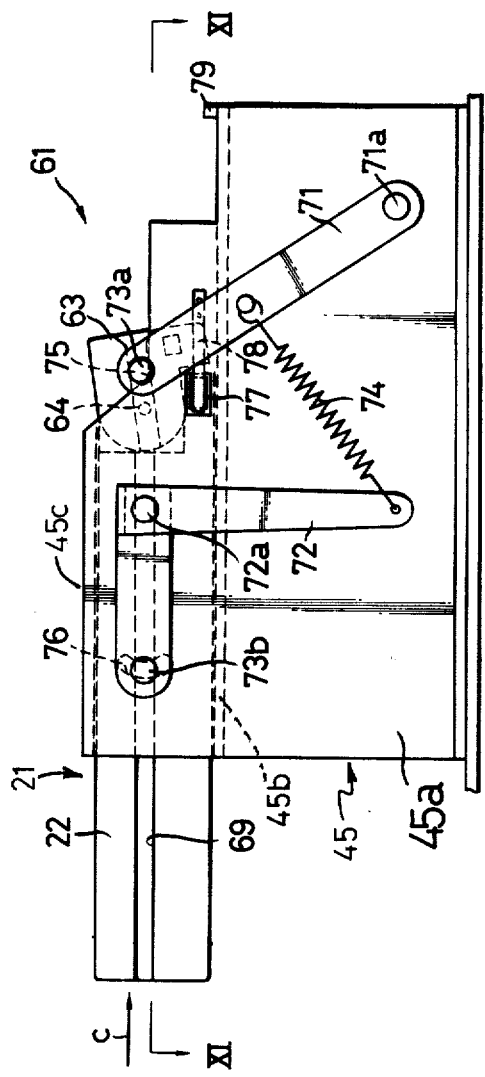

3,962,727

MAGNETIC ROTARY HEAD RECORDER WITH AUTOMATIC TAPE LOADING AND UNLOADING

BACKGROUND OF THE INVENTION

1. Field of the Invention

This invention relates generally to magnetic recording and/or reproducing apparatus, such as, cassette-type video tape recording and reproducing apparatus (VTR), and more particularly is directed to improvements in an automatic tape loading and unloading device for such apparatus.

2. Description of the Prior Art

Existing video tape recording and reproducing apparatus generally comprise a tape guide drum having a rotary magnetic head assembly associated therewith to record or reproduce video signals on a magnetic tape which is usually wound on supply and take-up reels with the tape between such reels being wrapped about at least a portion of the circumferential surface of the drum and being driven by a cooperating capstan and pinch roller and by suitable rotation of the take-up reel. In preparing such a video tape recording and reproducing apparatus for operation, the tape extending between the supply and take-up reels, which are preferably contained in a cassette, must be placed around or wrapped about at least a portion of the drum circumference so that the tape will be guided thereby with respect to the rotary magnetic head assembly.

In order to avoid the obvious disadvantages of manually withdrawing the tape between the reels from the cassette and threading the tape about the guide drum and the various other guide members and between the pinch roller and capstan in preparation for a recording or reproducing operation, and of manually removing the tape from the guide drum and returning the tape to the cassette at the completion of such an operation, automatic tape loading and unloading devices have been proposed for performing the foregoing functions.

One type of previously proposed automatic tape loading and unloading device for a video signal recording and/or reproducing apparatus, for example, as disclosed in detail in U.S. Pat. No. 3,821,805, issued June 28, 1974, and having a common assignee herewith, includes a support ring which is turnable around the guide drum in a substantially horizontal arcuate path that extends under the cassette when the latter is received and positioned by the holder therefor, tape engaging members including a pinch roller which project upwardly from the support ring so as to extend into an opening of the cassette for engagement with the tape therein when the ring is in an inactive or starting position, such tape engaging members drawing a loop of tape from the cassette and wrapping one side of the tape loop around the guide drum and between the pinch roller and a capstan upon turning of the ring to an operative position during a tape loading operation, and a tape guiding member mounted on the support ring and is moved relative to the latter from an inner position, at which the tape guiding member also extends upwardly into the cassette opening with the support ring at its inactive or starting position so as to be disposed within the tape loop, to an outer position spaced outwardly from the support ring in response to movement of the latter to its operative position during a loading operation, so that the tape guiding member then holds the other side of the tape loop away from the guide drum.

With a tape loading and unloading device of the type described above, the holder for the cassette has to include a table which is movable substantially vertically between a raised position, at which the table is above the tape engaging members on the support ring at its inactive position and also above reel drive members so that a cassette can be slidably installed on or withdrawn from the raised table, and a lowered position at which the tape engaging members project into the opening of the cassette positioned on the lowered table and the reel drive members also extend through openings in the table and cassette housing for engagement with the reels in the latter. Therefore, the existing tape loading and unloading device has to be associated with a relatively complicated cassette holder, for example, as disclosed in detail in U.S. Pat. No. 3,833,921, issued Sept. 3, 1974, and also having a common assignee herewith.

OBJECTS AND SUMMARY OF THE INVENTION

Accordingly, it is an object of this invention to provide an improved tape loading and unloading device for a cassette-type magnetic recording and/or reproducing apparatus which permits a cassette to be moved horizontally to and from an operative position in a stationary holder therefor.

Another object is to provide a tape loading and unloading device, as aforesaid, which facilitates the installation of a cassette in its operative position and the withdrawal of the cassette from such position.

Still another object is to provide a tape loading and unloading device, as aforesaid, which is relatively simple in construction and operation.

A further object is to provide a tape loading and unloading device for a cassette-type magnetic recording and/or reproducing apparatus, as aforesaid, in which, with a cassette operatively positioned in a stationary holder therefor, a single control mechanism may be actuated for extending tape engaging members of the tape loading and unloading device into the cassette housing to engage the tape therein, and for moving reel drive members into the cassette housing for engagement with the reels on which the tape is wound.

In accordance with an aspect of this invention, in a tape loading and unloading device for a cassette-type magnetic recording and/or reproducing apparatus, as aforesaid, the support ring is constituted by first and second arcuate parts which are pivotally connected in end-to-end relation so that the first arcuate part, which extends toward the cassette holder in the inactive position of the support ring and which carries the tape engaging members, may swing relative to the second part between a raised position when the tape engaging members project upwardly into the opening of a cassette operatively positioned on a stationary cassette holder for engaging the tape extending across such opening, and a depressed position when the tape engaging members are disposed below the cassette holder to avoid interference with the horizontal sliding of a cassette to and from its operative position on the holder.

It is another feature of the invention to provide a cassette-type magnetic recording and/or reproducing apparatus having a tape loading and unloading device, as aforesaid, with reel drive members which are vertically movable between depressed positions below the stationary cassette holder and raised positions where the reel drive members project into a cassette operatively positioned on the holder for engaging the respective reels on which the tape is wound, and further to provide a control mechanism by which the above-mentioned first part of the support ring and the reel drive members are simultaneously moved between their respective depressed and raised positions.

The above, and other objects, features and advantages of the invention, will be apparent in the following detailed description of an illustrative embodiment thereof which is to be read in connection with the accompanying drawings.

BRIEF DESCRIPTION OF THE DRAWINGS

FIG. 2 is a side elevational view of the tape loading and unloading device of FIG. 1;

FIG. 3 is a detail perspective view of a portion of the tape loading and unloading device of FIG. 1;

FIG. 4 is a cross-sectional view taken along the line IV—IV on FIG. 1;

FIG. 5 is a detail sectional view taken along the line V—V on FIG. 4;

FIG. 6 is a detail side elevational view of a control cam included in the structure shown on FIG. 4;

FIG. 7 is a perspective view of a cassette intended for use in the apparatus according to this invention;

FIG. 8 is a perspective view similar to that of FIG. 7, but in which a lid of the cassette is shown in its opened position;

FIG. 9 is an enlarged, fragmentary sectional view showing details of a lid locking mechanism included in the cassette of FIGS. 7 and 8;

FIG. 10 is a side elevational view of a cassette holder, and illustrating the installation of a cassette therein;

FIG. 12 is an elevational view similar to that of FIG. 10, but illustrating the cassette in its operative position in the holder.

DESCRIPTION OF A PREFERRED EMBODIMENT

Figure 1:
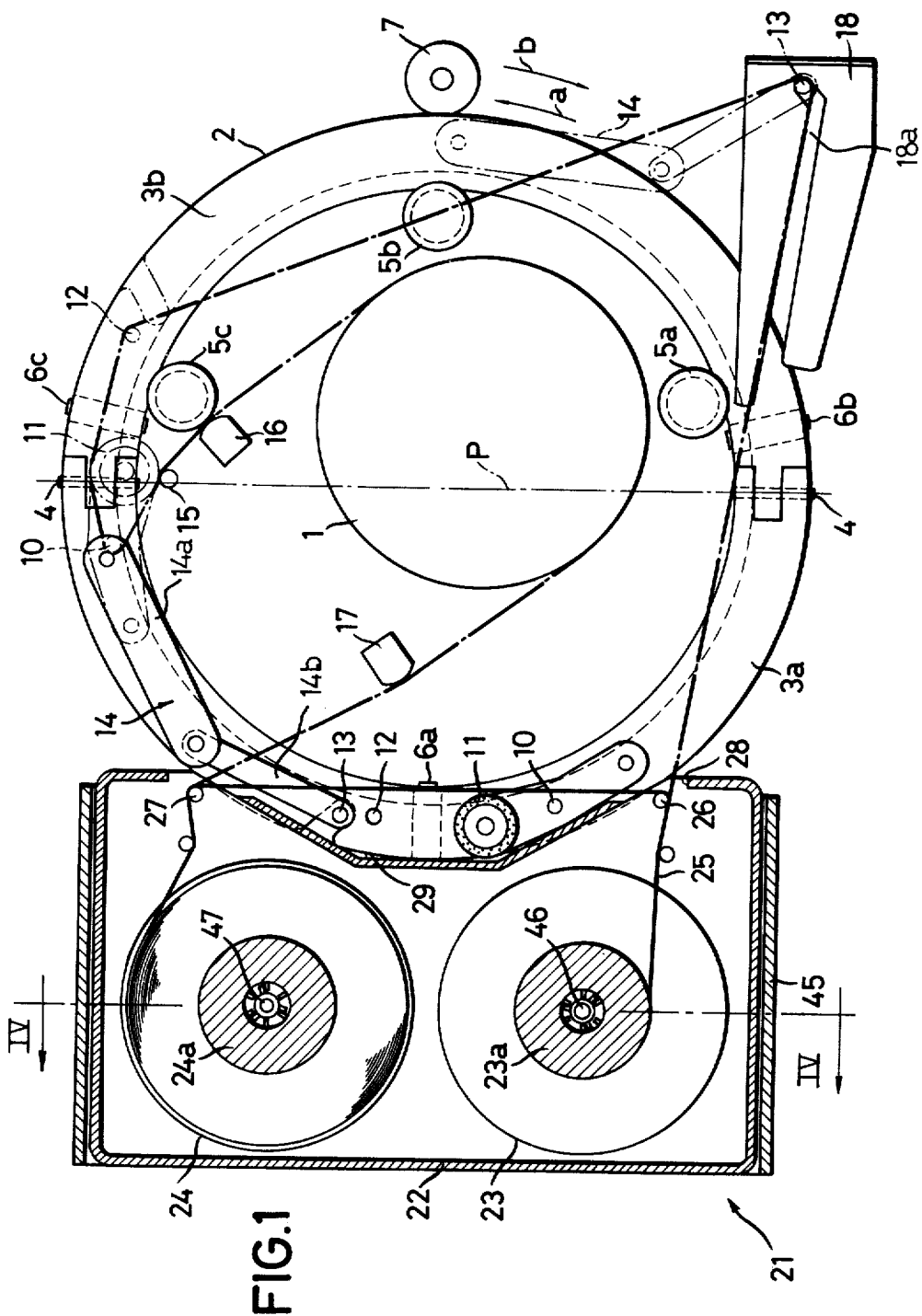
FIG. 1 is a schematic top plan view of a cassette-type magnetic recording and/or reproducing apparatus having a tape loading and unloading device according to one embodiment of this invention, and with a cassette and holder therefor being shown partly broken away and in section.

Referring to the drawings in detail, and initially to FIG. 1 thereof, it will be seen that a magnetic recording and/or reproducing apparatus to which this invention is applied may be generally of the type disclosed in detail in U.S. Pat. No. 3,833,921. Such apparatus is shown to comprise a cylindrical tape guide drum 1 mounted on a chassis 32 and having a circumferential slot or gap (not shown), and one or more magnetic heads (not shown) which are moved along the slot or gap, that is, in a circular path substantially coinciding with the peripheral surface of drum 1.

A cassette holder indicated generally by the reference numeral 45 is suitably mounted on the chassis in front of guide drum 1 and is adapted to receive a tape cassette 21 and to operatively position the latter for a recording or reproducing operation. The tape cassette 21 is shown to include a supply reel 24 and a take-up reel 23 rotatably contained within a housing 22 and having a magnetic tape 25 wound thereon. The tape extending between reels 23 and 24 is guided about guide pins 26 adjacent reel 23 and about guide pins 27 adjacent reel 24 so as to normally follow a path including a run between guide pins 26 and 27 at which the tape is exposed through an opening 28 extending along one side of housing 22 and an opening or cutout 29 in the bottom of housing 22 which is contiguous to opening 28.

Rotatable reel drive members 46 and 47 extend upwardly from the chassis and, as hereinafter described in detail, are respectively engageable with hubs 23a and 24a of reels 23 and 24, respectively, when the cassette 21 is disposed in the operative position of FIG. 1 on holder 45. When reel drive members 46 and 47 are engaged with the respective reels 23 and 24, suitable drive assemblies (not shown) may be operative for driving take-up reel drive members 46 in the direction winding the tape 25 on take-up reel 23 during recording, reproducing and fast-forward operations of the apparatus, and for driving supply reel drive member 47 in the direction for rewinding the tape on supply reel 24 during rewinding operation of the apparatus.

The recording and/or reproducing apparatus is further shown to include a capstan 15 which is suitably driven from a drive motor (not shown), a fixed magnetic head assembly 15 for recording and/or reproducing audio and control signals, and an erasing head 17, all of which are mounted on the chassis at predetermined spaced apart positions. In order to operate the magnetic recording and/or reproducing apparatus, it is necessary to load the tape from cassette 21 on holder 45 about at least a portion of the circumferential surface of guide drum 1 for scanning by the associated rotary magnetic head or heads, and further to engage the magnetic tape with capstan 15 for driving by the latter and also with the fixed magnetic heads 16 and 17. When it is desired to remove the cassette 21 from the apparatus at the conclusion of a recording or reproducing operation, it is necessary to unload the tape from about drum 1 and return the tape to within the cassette 21.

In the illustrated apparatus, a device for performing the above described tape loading and unloading functions is shown to be generally of the type disclosed in detail in U.S. Pat. No. 3,821,805. Such tape loading and unloading device is shown to generally include an annular support member 2, preferably in the form of a ring, which is rotatably supported, as hereinafter described in detail, for rotation about guide drum 1 in a circular or arcuate path that extends under the opening 29 in the bottom of the housing 22 of a cassette 21 operatively positioned by the holder 45. The support ring 2 may be disposed eccentrically with respect to guide drum 1, as shown, to provide a relatively large space therebetween for accommodating capstan 15 and fixed heads 16 and 17. Mounted on support ring 2 is a tape engaging assembly which is shown to include a support arm pivoted, at one end, on ring 2, a freely rotatable, upstanding pinch roller 11 carried by theh opposite or free end portion of the pivoted support arm, and a tape engaging member or pin 10 extending upwardly from the pivoted support arm intermediate the ends of the latter.

The tape engaging assembly constituted by pin 10 and pinch roller 11 is located on support ring 2 so that, when the support ring is in its starting or inactive position, as indicated in full lines on FIG. 1, tape engaging pin 10 and pinch roller 11 will be disposed to extend upwardly through the opening 29 at the bottom of the cassette housing 22 operatively positioned on holder 45, with pin 10 and pinch roller 11 being then disposed at the side of the tape run extending between guide pins 26 and 27 facing away from guide drum 1. Further, when support ring 2 is turned from its inactive position through approximately 250° in the counterclockwise direction, that is, in the direction of the arrow *a* on FIG. 1, to its operative position, pinch roller 11 will be disposed adjacent capstan 15, as indicated in broken lines on FIG. 1, and can be urged against the capstan for cooperation with the latter in driving the magnetic tape therebetween.

The tape engaging members on support ring 2 are further shown to include an upstanding tape guide pin 12 mounted on the support ring at a fixed location spaced by a relatively small distance from pinch roller 11 in the clockwise direction so that, when support ring is in its starting or inactive position, such tape guiding pin will be at the location shown in full lines so as to be adapted to project upwardly into opening 29 of the cassette housing 22 operatively positioned by holder 45. Finally, as in the case of the tape loading and unloading device disclosed in U.S. Pat. No. 3,821,805, the tape loading and unloading device of the apparatus shown on FIG. 1 further comprises a tape guiding assembly constituted by a tape guiding pin 13 mounted on support ring 2 by means of a pivoted arm assembly 14 so that the tape guiding pin 13 is movable relative to support ring 2 between an inner position indicated in full lines on FIG. 1, at which tape guiding pin 13 is spaced from pinch roller 11 by a relatively small distance along ring 2 in the clockwise direction so as to be also adapted to project upwardly into cassette opening 29 with support ring 2 in its starting or inactive position, and an outer position, shown in broken lines on FIG. 1, and at which tape guiding pin 13 is spaced outwardly from support ring 2 and also spaced a relatively large distance from pinch roller 11 in the clockwise direction along the support ring. In order to permit the foregoing movements of tape guiding pin 13 relative to support ring 2, the arm assembly 14 may include an arm 14a pivoted at one end on ring 2 and being yieldably urged in the counterclockwise direction to the position shown in full lines on FIG. 1, and an arm 14b which extends pivotally from the free end of arm 14a and carries the upstanding tape guiding pin 13. When support ring 2 is in its inactive or starting position, arms 14a and 14b extend generally along ring 2 in the direction toward pinch roller 11 so as to dispose tape guiding pin 13 at its inner position relatively close to pinch roller 11.

In order to move tape guiding pin 13 from such inner position to its outer position in response to turning of support ring 2 from its starting or inactive position to its operative position, the illustrated tape loading and unloading device is further shown to have an actuating member 18 which is fixedly located on the chassis at a location adjacent support ring 2 past which the pivoted end of arm 14a moves during the turning of the support ring between its inactive and operative positions. Actuating member 18 is shown to project over the outer periphery of support ring 2 and to have an elongated slot 18a opening at the free end of the actuating member for receiving a locating pin (not shown) depending from tape guiding pin 13 as ring 2 is moved from its inactive position toward its operative position. Slot 18a is shown to diverge from ring 2 in the direction from its open end toward its opposite end which terminates in a laterally enlarged locking portion of the slot.

The illustrated tape loading and unloading device, insofar as it is described above, operates as follows:

Starting with support ring 2 in its inactive position so that pinch roller 11 and pins 10, 12 and 13 are in the positions shown in full lines on FIG. 1 and are adapted to project upwardly into opening 29 of a cassette 21 operatively positioned on holder 45, support ring 2 is suitably driven or turned in the direction of the arrow *a*. Such turning of ring 2 causes tape engaging pin 10 to draw a loop of the tape 25 from cassette 21 and to wrap one side of the loop about a portion of the periphery of guide drum 1. While the tape loop is thus being formed by tape engaging pin 10, pinch roller 11 and tape guiding pins 12 and 13 are all disposed within the tape loop. During continued turning of ring 2 in the direction of arrow *a*, the tape loop is progressively extended with one side of the loop being further wrapped about the periphery of guide drum 1, while the other side of the tape loop is engaged successively by tape guiding pins 12 and 13 and thereby held away from the periphery of the guide drum. In the course of the turning of ring 2 in the direction of arrow *a*, the locating pin depending from guiding pin 13 enters slot 18a of actuating member 18 and moves along such slot toward the laterally enlarged locking portion at the closed end of the slot. As the locating pin moves along slot 18a and the pivot of arm 14a continues in the counterclockwise direction along the circular path of ring 2, arms 14a and 14b initially swing as a unit in the clockwise direction relative to ring 2 and, when the locating pin reaches the closed end of slot 18a, arm 14b jack-knifes in the counterclockwise direction relative to arm 14a and causes rapid turning of arm 14a in the clockwise direction about its pivot on ring 2. Thereafter, continued movement of ring 2 in the direction of arrow *a*, while the locating pin is retained in the laterally enlarged locking portion of slot 18a, causes arm 14b to turn in the clockwise direction relative to arm 14a until it is positioned, as shown in broken lines on FIG. 1, with tape guiding pin 13 moved to its outer position relative to ring 2. When support ring 2 attains its operative position, the side of the tape loop between guide drum 1 and tape engaging member 10 is engaged with head assembly 16 and passes between capstan 15 and the adjacent pinch roller 11. Upon the completion of the foregoing tape loading operation, a recording or reproducing operation can be initiated and, during such operation, the tape 25 is transported about guide drum 1 from supply reel 24 to takeup reel 23, for example, by pressing pinch roller 11 against rotated capstan 15 and by suitably rotating take-up reel drive member 46.

At any desired time, the recording or reproducing operation can be discontinued, and an unloading operation initiated by suitably rotating support ring 2 in the clockwise direction, that is, in the direction of the arrow *b* on FIG. 1, so as to return ring 2 from its operative position to its inactive or starting position. During such turning of ring 2, one or the other of the reel drive members 46 and 47 may be suitably rotated to take up on the respective reel 23 or 24 the slack tape that results from the movement of tape engaging pin 10 and the consequent reduction of the size of the tape loop. Further, during the turning of support ring 2 in the direction of arrow *b*, the action of arm assembly 14 carrying tape guiding pin 13 is reversed in passing from the condition shown in broken lines on FIG. 1 to the condition shown in full lines. Upon the return of support ring 2 to its starting or inactive position, the tape 25 is fully unwrapped from guide drum 1 and restored to the run between guide pins 26 and 27 in cassette 21.

Further, pinch roller 11 and tape guide pins 10, 12 and 13 are restored to the positions within cassette opening 29 indicated in full lines on FIG. 1.

It will be apparent that, with support ring 2 of the tape loading and unloading device in its starting or inactive position in which pinch roller 11 and tape guiding pins 10, 12 and 13 project upwardly in cassette opening 29 at the side of the tape run between guide pins 26 and 27 facing away from guide drum 1, the removal of cassette 21 from its operative position on holder 45 requires relative vertical movement of the cassette and of pinch roller 11 and tape guiding pins 10, 12 and 13 so as to withdraw the latter elements from cassette opening 29. In existing cassette-type magnetic recording and/or reproducing apparatus having a tape loading and unloading device as described above, such relative vertical movement has been provided by constructing the cassette holder with a table which is movable substantially in a vertical direction between a raised position, at which the table is above the tape engaging elements 10–13 on support ring 2 at the inactive position so that a cassette can be slidably installed on or withdrawn from the raised table, and a lowered position at which the tape engaging elements 10–13 project into the cassette opening 19 of the cassette on the lowered table, for example, as disclosed in detail in U.S Pat. No. 3,833,921. However, in accordance with the present invention, it is desired that the cassette holder 45 be stationary and that the cassette 21 be movable horizontally to and from its operative position on such stationary holder. In order to permit such horizontal movement of the cassette 21 to and from its operative position on holder 45, support ring 2 of the tape loading and unloading device according to this invention is shown to be made up of first and second semi-circular parts 3a and 3b which are arranged end-to-end so as to form a complete circle, with the adjacent ends of semi-circular parts 3a and 3b being connected by pivot pins 4 defining a diametrically extending pivoting axis P so that the first semi-circular part 3a may swing relative to the second semi-circular part 3b about axis P between a raised position coplanar with part 3b, as shown in full lines on FIG. 2, and a depressed position, shown in broken lines on FIG. 2, and in which part 3a of support ring 2 is inclined downwardly from the arcuate path of travel of such support ring between its starting or inactive position and its operative position. As is particularly shown on FIG. 1, all of the tape engaging elements of the tape loading and unloading device, that is, tape guiding pins 10, 12 and 13 and pinch roller 11, are mounted on the part 3a of support ring 2, with such part 3a of the support ring extending toward holder 45 in the inactive or starting position of support ring 2. Thus, when ring 2 is in its starting or inactive position, the movement of its part 3a downwardly to the depressed position shown in broken lines on FIG. 2 will be effective to lower the tape guiding pin 10, and also pinch roller 10 and tape guiding pins 12 and 13 to an escape position indicated at EP so that the cassette 21 can be moved horizontally, for example in the direction of the arrow c, to its operative position on the cassette holder without interference from tape guiding pins 10, 12 and 13 or pinch roller 11. Thereafter, with cassette 21 in its operative position, the movement of ring part 3a to its raised position coplanar with ring part 3b, as shown in full lines on FIG. 2, is effective to extend tape guiding pins 10, 12 and 13 and pinch roller 11 upwardly into the opening 29 of the operatively positioned cassette.

In order to provide for the above described swinging movements of ring part 3a relative to ring part 3b when support ring 2 is in its inactive position, and further to support ring 2 for rotational movement, as a unit, between its inactive and operative positions, as previously described herein, the undersurface of support ring 2 rests on three support rollers 6a, 6b and 6c which are spaced apart along the arcuate path of travel of ring 2 between its inactive and operative positions. The support rollers 6b and 6c are suitably rotatably mounted on chassis 32 at fixed locations so as to be engaged with ring part 3b when support ring 2 is in its inactive position, while the remaining support roller 6a is located so as to be engageable with ring part 3a at approximately the middle of the latter when support ring 2 is in its inactive position. Further, support roller 6a is shown on FIGS. 2 and 3 to be mounted for substantially vertical movement by a support device 31 which includes a support arm pivoted at one end, as at 33, on a bracket depending from chassis 32, and having a U-shaped member 34a at the free end of arm 34 in which roller 6a is journalled. Thus, with support ring 2 in its inactive position, swinging of support arm 34 between the positions shown in full and broken lines, respectively, on FIG. 2 is effective to raise and lower support roller 6a and thereby permit gravity to effect the movement of ring part 3a between its raised and depressed positions, respectively.

Support ring 2 is further guided by three guide rollers 5a, 5b and 5c which are rotatable about vertically extending axles projecting upwardly from chassis 32, and which have grooved peripheries engageable with the inner edge or periphery of support ring 2. The guide rollers 5a, 5b and 5c are spaced apart along the arcuate path of travel of support ring 2 so as to be all engageable with ring part 3b when support ring 2 is in its inactive position. Further, a drive roller 7 which may be driven from a suitable motor (not shown) is rotatably mounted above chassis 32 so as to engage the outer periphery or edge of support ring 2 adjacent the location of guide roller 5b. It will be apparent that drive roller 7 urges support ring 2, as a unit, toward the left, as viewed on FIG. 1, so as to maintain the inner edge or periphery of the support ring in contact with guide rollers 5a, 5b and 5c, which thereby establish the arcuate path of travel of the support ring. Further, the rotation of drive roller 7 in one direction or the other is effective to rotate support ring 2 either in the direction of the arrow a or in the direction of the arrow b. With support ring 2 in its inactive position, it will be seen that the guide rollers 5a, 5b and 5c and the drive roller 7 engaging only ring part 3b will not interfere with the previously described movement of ring part 3a between its raised and depressed positions. However, when ring part 3a is in its raised position as a result of upward movement of support roller 6a to the position shown in full lines on FIG. 2, the rotation of drive roller 7, for example, in the direction for turning support ring 2 from its inactive position toward its operative position, will result in the turning of the ring parts 3a and 3b, as a unit, in an arcuate path established by guide rollers 5a–5c and drive roller 7.

In order to effect the movement of ring part 3a between its raised and depressed positions with support ring 2 in its inactive position, the tape loading and unloading device according to this invention is shown to further include a control mechanism constituted by a slide 35 extending under chassis 32 and being guided for longitudinal movement in supports 36 depending from chassis 32. A cam member 37 extends upwardly from slide 35 which may be urged longitudinally in the direction of the arrow e on FIG. 2, as by a spring 39, to an inoperative position in which a stop 40 on slide 35 engages against one of the supports 36 and the cam member 37 is moved out from under the U-shaped member 34a, as indicated in broken lines on FIG. 2, whereby to permit the downward movement of ring part 3a to its depressed position. However, when slide 35 is longitudinally displaced in the direction of the arrow d, an inclined edge on cam member 37 acts against U-shaped member 34a so as to raise the latter until the cam member 37 reaches its operative position with member 34a resting thereon so as to cause the associated roller 6a to support ring part 3a in its raised position, as shown in full lines on FIG. 2. The movement of slide 35 and cam 37 to the operative position of the latter, shown in full lines, may be effected manually, for example, as by a manually actuable knob or the like connected through a suitable linkage to slide 35. Alternatively, as shown on FIG. 2, a solenoid 42 may have its armature connected to slide 35 by means of a pivoted link 41 so that, when solenoid 42 is energized to retract its armature to the position shown in full lines on FIG. 2, link 41 causes movement of slide 35 in the direction of the arrow d against the force of the return spring 39. With the above described control mechanism for ring part 3a, solenoid 42 is initially deenergized to permit spring 39 to dispose slide 35 and cam member 37 in the inoperative position shown in broken lines, whereby to dispose ring part 3a in its depressed position during the horizontal sliding of the cassette 21 to its operative position. After cassette 21 has been disposed in its operative position, solenoid 42 is energized to move cam member 37 to its operative position and thereby dispose ring part 3a in its raised position with the associated tape guiding pins 10, 12 and 13 and the pinch roller 11 projecting upwardly into the cassette opening, as previously described. The energizing of solenoid 42 is thereafter maintained during a tape loading operation, recording or reproducing operations and an eventual tape unloading operation. However, upon the completion of a tape unloading operation, that is, upon the return of support ring 2 to its inactive position, solenoid 42 may be deenergized with the result that ring part 3a is moved to its depressed position for withdrawing the associated tape guiding pins 10, 12 and 13 and pinch roller 11 from the cassette 21 and thereby permitting horizontal removal of the tape cassette from its operative position.

Referring now to FIG. 4, it will be seen that the cassette holder 45 may comprise parallel, spaced apart side walls 45a which are suitably secured to, and extend upwardly from chassis 32, a base 45b extending horizontally between side walls 45a, and flanges 45c directed inwardly from the upper edges of side walls 45a above base 45b so that, when cassette 21 is moved slidably over base 45b, the cassette housing 22 will be laterally guided by side walls 45a and held against upward movement away from base 45b by the flanges 45c.

It will be apparent that, if cassette 21 is to be horizontally slidable on base 45b to and from the operative cassette position in holder 45, and if reel drive members 46 and 47 are to be engageable in hubs 23a and 24a of reels 23 and 24, respectively, when the cassette is in its operative position, then reel drive members 46 and 47 will have to be vertically movable between depressed positions, as shown in full lines on FIG. 4, in which reel drive members 46 and 47 are retracted below the surface of base 45b so as to permit the horizontal sliding of the cassette on such base, and raised or operative positions, as shown in broken lines on FIG. 4, in which reel drive members 46 and 47 project upwardly through respective openings in base 45b and through aligned openings in the bottom wall of housing 22 of the operatively positioned cassette 21 for engaging in the respective reel hubs 23a and 24a. In the illustrated embodiment, such vertical movement of reel drive members 46 and 47 is made possible by mounting the reel drive members 47 and 46 for axial slidable movement on fixed tubes 48a and 48b projecting upwardly from chassis 32. Further, the reel drive members 47 and 46 are axially slidable within driving sleeves 49 and 50, respectively, which have cylindrical outer surfaces and bottom walls that are rotatably supported on chassis 32 by means of thrust bearings 51a and 51b. The upper ends of driving sleeves 49 and 50 are disposed substantially at the level of base 45b and are open so as to permit reduced diameter bosses 52a and 52b of reel drive members 47 and 46, respectively, to extend upwardly therethrough when the reel drive members are moved to their raised or operative positions. The lower portions of reel drive members 46 and 47 have non-circular, for example, hexagonal peripheries 53, as shown particularly on FIG. 5, and the inner surface 54 of each of the driving sleeves 49 and 50 is similarly hexagonal so that each of the reel drive members 46 and 47 is rotatably coupled to the respective driving sleeve 50 or 49, respectively, while being axially slidable within the respective driving sleeve. Helical compression springs 55a and 55b extend around tubes 48a and 48b, respectively, between the lower surfaces of reel drive members 47 and 46 and the bottom walls of driving sleeves 49 and 50 so as to yieldably urge the respective reel drive members 47 and 46 axially upward toward their raised or operative positions. Shafts 57a and 57b extend axially through tubes 48a and 48b and through the bosses 52a and 52b of the respective reel drive members 47 and 46, and split rings or washers 58a and 58b are engaged in grooves in the upper ends of shafts 57a and 57b so as to bear downwardly on the upper end surfaces of bosses 52a and 52b.

A mechanism 44 for controlling the movements of reel drive members 46 and 47 between the depressed and raised positions of the latter is shown to include a cross member 56 extending laterally between shafts 57a and 57b and having the lower ends of such shafts journalled in the opposite end portions of cross member 56 so that vertical movement of the latter will cause corresponding vertical or axial movements of shafts 57a and 57b. Further, as shown particularly on FIGS. 2 and 6, a cam member 38 is fixed on slide 35 for movement with the latter and is formed with an inclined downwardly facing edge 38a which is engageable over a cross member 56. Cam member 38 is located on slide 35 so that when the latter is moved in the direction of the arrow e on FIG. 6 to dispose cam 38 in the position shown in full lines, which position corresponds to the condition of the control mechanism 31 for moving ring part 3a to its depressed position, the edge 38a of cam 38 will effect downward movement of cross member 56 and thereby move reel drive members 46 and 47 to their depressed positions against the force of springs 55a and 55b. Conversely, when slide 35 is moved in the direction of the arrow $d$ so as to dispose cam 38 in the position shown in full lines on FIG. 2, the edge 38a of cam member 38 permits upward movement of cross member 56 by the force of springs 55a and 55b urging reel drive members 47 and 46 to their raised or operative positions. It will be apparent from the foregoing that the control mechanism 44 for the reel drive members 46 and 47 is connected with the control mechanism 31 for the ring part 3a by way of the common slide 35 so that ring part 3a and reel drive members 46 and 47 are simultaneously moved between their respective depressed and raised positions.

It will be apparent that, after a cassette 21 has been horizontally moved over base 45b of holder 45 to its operative position in respect to the latter, and during which movement reel drive members 46 and 47 and ring part 3a are in their depressed positions, solenoid 42 is energized to displace slide 35 in the direction of the arrow $d$ on FIG. 2 so that cam member 37 raises ring part 3a and cam member 38 permits reel drive members 46 and 47 to be spring urged to their raised positions, with the result that tape guiding pins 10, 12 and 13 and pinch roller 11 are extended upwardly into the cassette opening for engagement with the tape and the bosses 52a and 52b of the reel drive members are projected into the hubs of the respective reels 24 and 23. Thereafter, support ring 2 may be driven by drive roller 7 to effect the previously described tape loading operation and, at the completion thereof, a recording or reproducing operation of the apparatus may be effected during which the tape is driven by the cooperative action of capstan 15 and pinch roller 11, while an idler wheel 57 (FIG. 4) included in a drive assembly for the take-up reel 23 is suitably rotated in contact with the cylindrical outer surface of driving sleeve 50 so as to rotate the associated reel drive member 46 and the take-up reel 23 rotatably coupled therewith in the direction for winding the tape on the take-up reel. During fast-forward and rewind operations of the apparatus, the driving sleeves 50 and 49, respectively, are suitably driven in the direction to effect the rapid winding of the tape on the take-up reel 23 or on the supply reel 24, respectively, while such reels are coupled with the raised drive members 46 and 47.

Referring now to FIGS. 7 and 8, it will be seen that the cassette 21 for use in the recording and/or reproducing apparatus according to this invention preferably has a lid 63 for closing the opening 28 provided along one side of the cassette housing 22. Such lid 63 has right-angled end portions 63a which are adapted to lie against recessed portions 62 of end walls 62a of the cassette housing, and pivot pins 64, which may be formed integrally with end portions 63a of the lid, project inwardly from end portions 63a and are rotatably received in suitable sockets formed in recesses 62 so as to mount lid 63 for pivoting between a closed position (FIG. 7) and an opened position (FIG. 8). As shown particularly on FIG. 9, a spring plate 65 is secured at one end to the inner surface of one of the end walls 62a of cassette housing 22 and, adjacent its free end, the spring plate 65 carries an outwardly directed latching pin 66 which is adapted to extend through an aligned opening in the respective side wall 62a and into a keeper or opening 67a in the adjacent end portion 63a of lid 63 for locking the latter in its closed position. An operating projection 68 also extends outwardly from the middle portion of spring plate 65 through a respective opening 67b in the adjacent end wall 62a so that, when projection 68 is pushed inwardly, as hereinafter described, spring plate 65 is flexed inwardly, for example, to the position shown in broken lines on FIG. 9, for withdrawing pin 66 at least from the keeper opening 67a of the lid, and thereby permitting swinging of the latter to its opened position. Further, as shown on FIGS. 7 and 8, the opposite end walls 62a of cassette housing 22 are preferably formed with longitudinal grooves 69 extending from the recessed portions 62 parallel to the top and bottom walls of the cassette housing, and the end portions 63a of lid 63 are formed with grooves 70 which are aligned with the respective grooves 69 when lid 63 is in its closed position (FIG. 7). It will also be seen that the end of each groove 70 opening adjacent lid 63 is tapered in width, as at 70a, for facilitating the entry into grooves 70 of hereinafter described guide pins.

Figure 11:
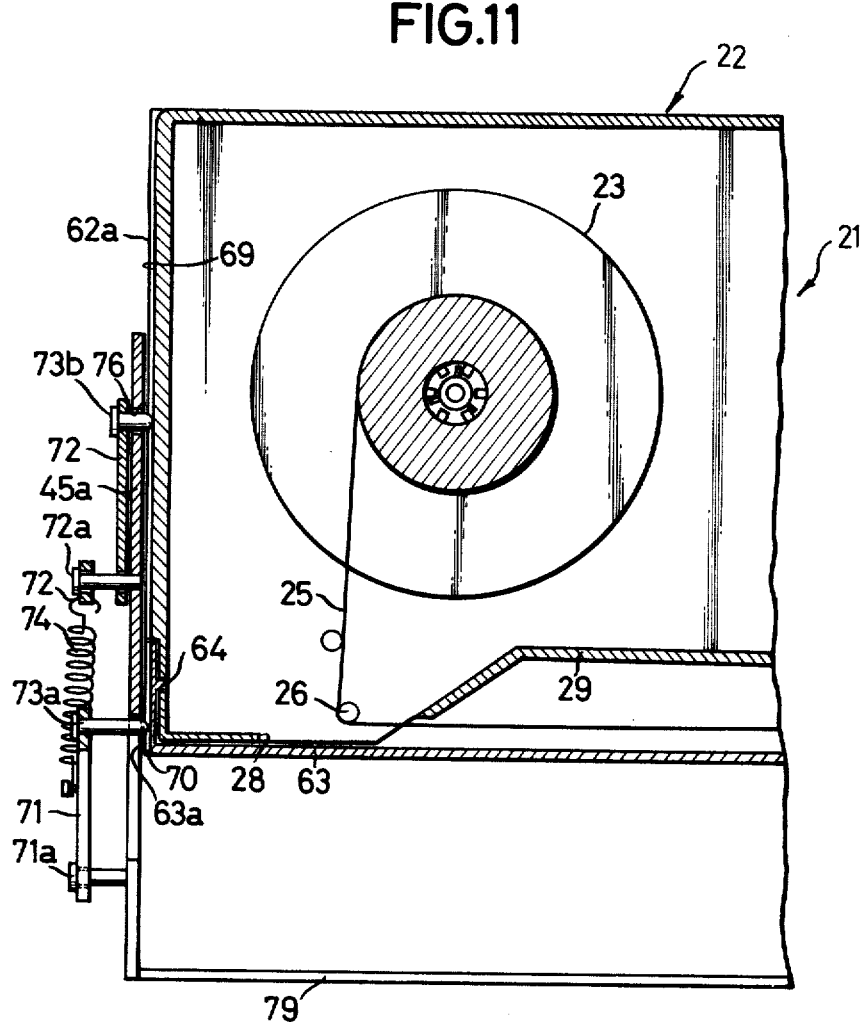
FIG. 11 is an enlarged sectional view taken along the line XI—XI on FIG. 10.

Referring now to FIGS. 10–12, it will be seen that, in the holder 45 intended for use in connection with the cassette having a pivoted lid 63, as described above, the flanges 45c which are intended to resist upward removal of the cassette from base 45b extend only along portions of the upper edges of the respective side walls 45a so that, as the cassette housing 22 nears its operative position (FIG. 12), for example, as the cassette housing is moved from the position shown on FIG. 10 to the position shown on FIG. 12, such flanges 45c will not interfere with upward pivoting of lid 63 to its opened position.

It is further to be noted that the cassette holder 45 is preferably provided with a mechanism 61 by which the horizontal sliding movement of the cassette over base 45b to its operative position against a stop 79 extending from the base at the edge of the latter extending towards guide drum 1 is effective to release latch pin 66 from the keeper opening 67a, to pivot lid 63 to its opened position and to hold the cassette housing 22 securely against the base 45b. Such mechanism 61 is shown to include an arm 71 disposed outside of each side wall 45a and being pivotally mounted, at its lower end, on a pivot pin 71a extending from the respective side wall of the holder adjacent the portion of the latter which faces toward the guide drum. Further, a bellcrank 72 is disposed outside of each side wall 45a in front of the respective arm 71 and is pivotally mounted, intermediate its ends, on a pivot pin 72a which extends outwardly from the upper portion of the adjacent side wall 45a. Each bell crank 72 is shown to have a substantially horizontal arm directed forwardly from its respective pivot pin 72a and a downwardly directed arm. The upper end portion of each arm 71 carries an inwardly directed guide pin 73, while the forwardly directed arm of each bell-crank 72 carries an inwardly directed guide pin 73b which extends through an arcuate slot 76 in the adjacent side wall 45a so as to permit limited angular displacement of bellcrank 72. The upper portion of each side wall 45a of the holder in the region thereof adjacent the respective pivoted arm 71 is cut out, as particularly shown on FIGS. 10 and 12, so as to define a seat 75 against which the respective guide pin 73a can initially rest, and a tension spring 74 is connected between each arm 71 and a tension spring 74 is connected between each arm 71 and the depending or downwardly directed arm of the respective bellcrank 72. It will be apparent that each spring 74 urges arm 71 in the counterclockwise direction to the position shown on FIG. 10 in which the respective guide pin 73a rests on seat 75. Further, each spring 74 urges the respective bell-crank 72 in the counterclockwise direction, for example, to a position in which the respective guide pin 73b rests against the lower end of the arcuate slot 76. It is further to be noted that the guide pins 73a and 73b are of sufficient length to project inwardly beyond the inner surface of the adjacent side wall 45a for reception in the grooves 69 and 70 provided in the adjacent end of cassette housing 22, as hereinafter described. Further, the seat 75 provided on each side wall 45a is at a vertical distance from the upper surface of base 45b that is slightly larger than the vertical distance from the bottom of cassette housing 22 to the lower margins of the grooves 69 and 70 provided in the opposite ends of the cassette housing.

As shown particularly in FIGS. 9, 10 and 12, a lock releasing device is provided on holder 45 for releasing the latch pin 66 from keeper opening 67a when cassette 21, in moving toward its operative position on the holder, arrives at the position where opening of the lid 63 is initiated, as hereinafter described in detail. Such lock releasing device is shown to include a leaf spring 78 fixedly secured, at one end, to the outer surface of the side wall 45a which is adjacent the end of the cassette having the latch provided therein, and a roller 77 rotatably carried by the free end of spring 78 and being normally urged by the latter through an opening in the adjacent side wall 45a, for example, to the position indicated in broken lines on FIG. 9. The above described mechanism 61 operates as follows:

With the cassette 21 initially having its lid 63 in the closed position thereof, the cassette is horizontally inserted into holder 45 in the direction of the arrow c on FIG. 10 so as to slide over base 45b in the direction toward the stop 79, and with the lid 63 at the foremost side of the inserted cassette. During the initial insertion of the cassette in holder 45, guide pins 73 are led into grooves 70 by the flared ends 70a of such grooves and are raised from the lower ends of the respective arcuate slots 76 against the forces of the springs 74 acting on bell-cranks 72. As the cassette 21 nears the position shown on FIG. 10, the roller 77 which has been previously rolling along the surface of the adjacent end wall of cassette housing 22 enters opening 67b and is urged by spring 78 against projection 68 so as to overcome the force of spring plate 65 and thereby urge the latter to flex inwardly to the position shown in broken lines on FIG. 9, with consequent removal of the latch pin 66 from keeper opening 67a, whereby to permit the commencement of the opening of lid 63.

Of course, at the point where the latch or lock for lid 63 is released, as described above, the guide pins 73b on bell-crank 72 are engaged in grooves 69 and, by reason of the springs 74 acting on bellcrank 72, guide pins 73b act downwardly in grooves 69 for holding the cassette housing 22 downwardly against base 45b. Further, simultaneously with the release of the latch or lock for lid 63, guide pins 73a resting against the respective seats 75 are led into grooves 70 at the flared ends 70a of such grooves. By reason of the previously described location of seats 75 relative to the surface of base 45b, the entry of guide pins 73a into grooves 70 causes slight upward pivoting of lid 63 about the pivot pins 64, for example, to the position shown on FIG. 10. Such initial upward pivoting of lid 63 is effective to displace the keeper opening 67a out of registration with the latch pin 66 so that, as the horizontal movement of cassette 21 toward its operative position continues and roller 77 no longer acts on projection 68, the latch pin 66 cannot return to its locking position within keeper opening 67a.

As the horizontal movement of cassette 21 toward its operative position continues beyond the position illustrated on FIG. 10, the inclined grooves 70 receiving guide pins 73a act upon the latter to cause clockwise swinging of levers 71 against the forces of the respective springs 74. Thus, when cassette 21 attains its operative position against stop 79, as shown on FIG. 12, the cooperative action of pins 73a in slots 70 is effective to dispose such slots 70 substantially in vertical directions, with the lid 63 being pivoted to its fully open position for exposing the opening 28 of the cassette housing. It will be apparent that, with cassette 21 in its operative position and arms 71 extending substantially vertically from their respective pivot pins 71a, the respective springs 74 are elongated so as to exert increased forces on bell-cranks 72 by which the guide pins 73b act strongly downward in the respective grooves 69. Thus, when in its operative position, the cassette housing is strongly held against base 45b of holder 45.

When it is desired to remove cassette 21 from its operative position within holder 45, the cassette is merely moved horizontally toward the left, as viewed on FIG. 12, that is, in the direction opposed to that indicated by the arrow c. During such horizontal removal of the cassette from holder 45, the engagement of guide pins 73a in grooves 70 is effective to return lid 63 to its closed position covering opening 28 and, upon the return of lid 63 to its closed position, latching pin 66 is again urged by spring plate 65 into the keeper opening 67a for locking or latching the lid 63 in its closed position.

It will be apparent from the above that, in a cassette-type recording and/or reproducing apparatus having a tape loading and unloading device and cassette holder according to this invention, the cassette 21 can be very easily moved in the horizontal direction to and from its operative position in the holder without interference from either the tape engaging members of the tape loading and unloading device or from the reel drive members which are engageable with the take-up and supply reels of the cassette in the operative position of the latter.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In a magnetic recording and/or reproducing apparatus that includes a cylindrical tape guide drum with at least one rotary magnetic head moved in a circular path substantially coinciding with the periphery of said drum, a cassette holder spaced from said guide drum for receiving and positioning a tape cassette having a housing with an access opening and containing a magnetic tape which is wound on reels within the housing and extends between the reels across said opening, and a tape loading and unloading device comprising an annular support means rotatable around said drum between first and second positions in an arcuate path that is substantially planar and extends adjacent said holder, and tape engaging means mounted on said support means so as to extend substantially normal to the plane of said arcuate path and being movable with said support means for extending into said opening of the housing of a cassette positioned by said holder and engaging the tape extending across said opening with said support means in said first position and for withdrawing a progressively extended loop of said tape from the cassette housing and wrapping one side of the tape loop about at least a portion of said periphery of the guide drum in response to movement of said support means from said first position to said second position thereof; the improvement comprising said annular support means including at least first and second arcuate parts, means joining said first and second parts for movement of said first part relative to said second part generally in the directions normal to said plane of the arcuate path, said tape engaging means being mounted on said first part for movement with the latter in said directions normal to said plane of the arcuate path, said first part extending towards said holder in said first position of the support means, and means rotatably carrying said support means and maintaining said first and second parts of the latter in said plane of the arcuate path during movements of said support means between said first and second positions, said means rotatably carrying said support means including means operative to displace said first part in said directions normal to said plane of the arcuate path when said support means is in said first position so as to insert and withdraw said tape engaging means in respect to the opening of a cassette housing positioned by said holder.

2. An apparatus according to claim 1; in which said first and second parts of said support means are substantially semi-circular, and said means joining the first and second parts is constituted by pivotal connections between the adjacent ends thereof.

3. An apparatus according to claim 1; in which said means rotatably carrying said support means includes a plurality of rollers spaced apart along said arcuate path with at least one of said rollers engaging said first part of the support means in said first position of the latter; and said means operative to displace said first part includes a movable support for said one roller permitting displacements of the latter in said directions normal to said plane of the arcuate path, and control means acting on said movable support for effecting said displacements of said one roller.

4. An apparatus according to claim 1; in which said holder includes a base fixedly disposed in a plane substantially parallel to said plane of the arcuate path and adapted to have the cassette housing slidably moved thereover to and from an operative cassette position in said holder; and further comprising reel drive members movable axially in respect to said base of the holder between operative positions, in which said reel drive members project through said base for engagement with the reels in a cassette housing at said operative cassette position, and inoperative positions, in which said reel drive members are withdrawn in respect to said base for permitting the movement of a cassette housing to and from said operative cassette position, and means for effecting the movement of said reel drive members between said operative and inoperative positions thereof.

5. An apparatus according to claim 4; further comprising means mechanically connecting said means for effecting the movement of said reel drive members with said means operative to displace said first part of the support means so that said reel drive members are moved to said operative positions thereof simultaneously with the displacement of said first part of the support means for inserting said tape engaging means in the opening of a cassette housing at said operative cassette position.

6. An apparatus according to claim 1; in which said cassette housing has a lid normally extending across and substantially covering said opening of the housing and being movable to an open position; and in which said holder includes a base fixedly disposed in a plane substantially parallel to said plane of the arcuate path and adapted to have the cassette housing slidably moved thereover to and from an operative cassette position in said holder, and means operative to automatically move said lid to said open position thereof in response to the slidable movement of the cassette housing over said base to said operative cassette position.

7. An apparatus according to claim 6; in which said holder further includes means acting on a cassette housing in said operative cassette position for securely holding the cassette housing against said base.

8. In a magnetic recording and/or reproducing apparatus that includes a cylindrical tape guide drum with at least one rotary magnetic head moved in a circular path substantially coinciding with the periphery of said drum, a cassette holder spaced from said guide drum for operatively positioning a tape cassette having a housing which contains a magnetic tape wound on reels and extending between the latter across an opening of the housing which faces downwardly and generally toward said guide drum when the cassette is operatively positioned, and a tape loading and unloading device comprising an annular support means rotatable around said drum between first and second positions in an arcuate, substantially horizontal path that extends under said opening of a cassette housing operatively positioned by said holder, and tape engaging means projecting upwardly from said support means and being movable with the latter for extending into said opening of a cassette housing operatively positioned by said holder and engaging the tape extending across such opening with said support means in said first position and for withdrawing a progressively extended loop of said tape from the cassette housing and wrapping one side of the tape loop about at least a portion of said periphery of the guide drum in response to movement of said support means from said first position to said second position thereof; the improvement comprising said holder including a base fixedly disposed substantially in a horizontal plane and adapted to have the cassette housing slidably moved to and from the operative cassette position in said holder, said annular support means including first and second arcuate parts pivotally connected to each other in end-to-end relation for swinging of said first part relative to said second part between a raised position coplanar with said second part and a depressed position in which said first part is inclined downwardly from said horizontal path, said first part extends toward said holder in said first position of said support means and has said tape engaging means mounted on said first part for swinging with the latter relative to said second part, means rotatably carrying said support means including substantially vertically movable means carrying said first part in said first position of said support means for effecting movement of said first part between said depressed position, in which said tape engaging means are below said base of the holder to permit the sliding movement of the cassette housing to and from said operative cassette position, and said raised position, in which said tape engaging means project above said plane of the base to extend into said opening of a cassette housing operatively positioned thereon.

9. An apparatus according to claim 8; further comprising rotatable reel drive members movable substantially vertically in respect to said base of the holder between raised positions, in which said reel drive members project through said base for engagement with the reels in an operatively positioned cassette thereon, and depressed positions in which said reel drive members are disposed below said base, and control means for effecting simultaneous movements of said reel drive members and said first part of the annular support means between their respective raised and depressed positions.

10. An apparatus according to claim 8; in which said means rotatably carrying said support means includes a plurality of support rollers rotatable about substantially horizontal axes and being spaced apart along said arcuate path for engaging said support means from below, said substantially vertically movable means supports each one of said rollers which engages said first part of the support means in said first position of the latter, guide rollers spaced apart along only a portion of said arcuate path to engage one of the peripheral edges of said second part of the support means in said first position of the latter, and a drive roller disposed to engage the other peripheral edge of said second part in said first position of the support means and being rotatable to drive said support means between said first and second positions thereof.

11. In a magnetic recording and/or reproducing apparatus that includes a cylindrical tape guide drum with at least one rotary magnetic head moved in a circular path substantially coinciding with the periphery of said drum, a cassette holder spaced from said guide drum for receiving and positioning a tape cassette having a housing with an access opening and containing a magnetic tape which is wound on reels within the housing and extends the reels across said opening, rotatable reel drive members engageable with the reels in an operatively positioned cassette, and a tape loading and unloading device comprising support means rotatable around said drum between first and second positions, and tape engaging means mounted on said support means and being movable with said support means for extending into said opening of the housing of a cassette positioned by said holder and engaging the tape extending across said opening with said support means in said first position and for withdrawing a progressively extended loop of said tape from the cassette housing and wrapping one side of the tape loop about at least a portion of said periphery of the guide drum in response to movement of said support means from said first position to said second position thereof; the improvement comprising means for shifting said tape engaging means between engageable and disengageable positions with said tape, means for moving said reel drive members substantially vertically between raised positions, in which said reel drive members project so as to engage with the reels in an operatively positioned cassette, and depressed positions in which said reel drive members are disengaged with the reels, and control means for coordinating said shifting of the tape engaging means with said moving of the reel drive members so that said tape engaging means is shifted to said engageable positions thereof simultaneously with the movement of said reel drive members to said raised positions.

* * * * *